Feb. 14, 1961   J. W. RYZNAR   2,971,615
BRAKE ELEMENT
Filed Feb. 17, 1956
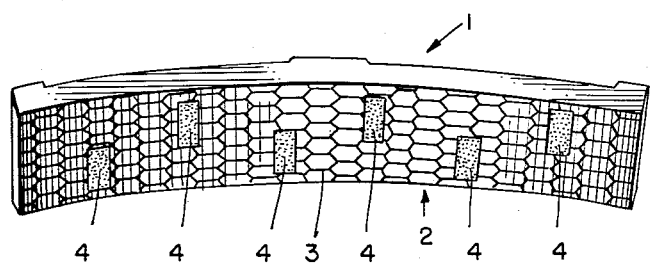
INVENTOR:
JOHN W. RYZNAR
BY Marshall, Johnston,
Cook & Root
ATT'YS

2,971,615
BRAKE ELEMENT

John W. Ryznar, La Grange, Ill., assignor to Nalco Chemical Company, a corporation of Delaware Filed Feb. 17, 1956, Ser. No. 566,255

2 Claims. (Cl. 188—256)

This invention relates to a new and improved brake element of the hard solid type for use in engagement with a complementary brake element.

An object of the invention is to provide a new and improved brake element of the type described having an enhanced coefficient of friction.

Another object of the invention is to provide an improved brake shoe of the metallic type which is particularly suited to high speed heavy braking conditions on railroads.

A further object of the invention is to provide a new and improved brake element which is adapted for use in automotive equipment.

Other objects and advantages of the invention will be apparent by reference to the accompanying drawing in which the single figure illustrates the best mode contemplated for the practical application of the invention.

Briefly stated the invention provides a new and improved friction brake member of the hard solid type containing in the braking surface a fine silica having a specific surface area greater than about 20 square meters per gram.

In the embodiment of the invention illustrated in the drawing the brake element generally shown at 1 has a braking surface generally shown at 2 which consists of a cast iron surface 3 and a series of resin blocks or inserts 4 containing a fine silica of the type previously described. The resin blocks or inserts 4 can be secured in the braking surface 2 in any suitable manner. The inserts 4 can be fixed with respect to the surface 3 or they can be resiliently mounted therein by mounting them on a resilient material or springs interiorly disposed in the braking element 1. The particular manner in which the inserts 4 are mounted in the braking element 1 does not constitute a part of this invention. The important feature of the invention is that the inserts 4 are substantially solid in nature and contain a fine silica of the type previously described. They preferably extend above the cast iron surface 3 for a slight distance of say 0.001 to 0.005 inch so that the fine silica contained therein is brought into contact with the complementary braking surface and distributed thereover. In this manner the coefficient of friction between the cast iron braking surface 3 and the complementary braking surface, not shown, is improved, particularly where the complementary braking surface is also a metal surface.

A brake shoe as illustrated in the drawing is therefore particularly useful in a clasp brake of the type used on railroad cars where brake shoes are brought into contact with the tread surface of the metal wheels used on railway rolling stock. Brake shoes of this type can also be used in conjunction with cast iron air cooled friction rotors of the type which are mounted on car wheel shafts of railway cars, interiorly of the wheels.

While the invention is especially desirable in providing a coating of fine silica between braking surfaces where both surfaces are metallic or contain metallic elements, it is also useful in improving the braking action where at least one of the braking surfaces is a composition surface. Thus, a braking element of the type described in U.S. Patent 2,728,700, can be provided with a surface containing fine silica in accordance with the invention. Such a braking element consists for the most part of a hard cured non-compressible block of molded friction composition, which block is provided with a smooth friction face adapted for engagement with a complementary braking element and contains a plurality of separately cured strips of yarn-like friction material which are relatively soft and relatively compressible with respect to the molded friction composition of the block and are preferably embedded in widely separated crisscrossing relation in said friction face through the depth of normal wear of the block with portions of the strips normally projecting beyond said face. These projecting portions are compressible into positions flush with the intervening portions of the friction face of the block. In the practice of the present invention said strips of yarn-like material are impregnated with a composition containing a fine silica.

According to another embodiment of the present invention the fine silica is embodied directly in the synthetic resin normally used in making a brake shoe of the synthetic resin type.

The invention is not limited to any particular method or composition containing the fine silica. If the fine silica is employed in an insert in a metal brake shoe of the type described in the drawing the insert can be prepared by molding the fine silica to the desired shape of the insert with or without the incorporation of other substances containing finely divided discrete particles, such as carbon, fine clay (kaolin) and other finely divided water insoluble materials (e.g., oxides and/or carbonates). For this purpose the fine silica is preferably mixed with a hydrophilic liquid with or without the addition of said other materials, shaped to the desired form and then dried. One suitable method of preparation is to harden to the desired shape compositions of the type described in U.S. Patent 2,509,026.

Another suitable method of preparation is to incorporate the fine silica in amounts from about 2% to 70% by weight of the composition into a thermosetting resin such as a phenol-aldehyde resin, a polyester resin, or an epoxy resin. For example, one type of phenol-aldehyde composition used in making brake elements is prepared by reacting cresylic acid, and not more than 58% (based on cresylic acid) of a 40% formaldehyde solution as described in U.S. Patent 1,980,221. A fine silica is incorporated in this composition in amounts from about 2% to about 70% by weight. It will be understood that the amounts may be varied depending upon the specific nature of the resin and also upon whether other materials are employed. The invention also contemplates the use of fine silica in asbestos filled phenol-aldehyde resin brake elements.

In a brake element of the type described in U.S. Patent 2,728,700, the yarn-like friction material is preferably made of cabled asbestos on wire cores. In the practice of the present invention this material is impregnated with a composition containing fine silica and then dried.

The preferred type of fine silica employed in accordance with the invention is one which when added to a liquid such as water or ethyl alcohol will form a silica sol. The silica employed for the purpose of the invention is available commercially and includes dried silica sols (e.g., a silica sol containing 30% $SiO_2$ in water which has been dried but is still partially hydrated), fine silicas made by burning silicon tetrachloride, dried surface esterified silicas (e.g., du Pont Valron), and the so-called silica aerogels (e.g., Santocel C and Santocel 54). The colloidal silicates can also be employed in accordance with the invention but are less desirable, particularly if the ratio of $Na_2O$ to $SiO_2$ is greater than 1:3.2. The colloidal silicas, both crystalline and amorphous, and the colloidal silicates, both crystalline and amorphous, have been described by Iler, "The Colloid Chemistry of Silica and Silicates," Cornell Press, 1955, and the present invention contemplates the use of any and all of such colloidal silicas and colloidal silicates, with the further proviso, however, that the colloidal silicas are preferred for the practice of the invention.

The surface esterified silicas which are employed for the purpose of the present invention are sometimes called estersils and form a new class of hydrophobic gels and powders as disclosed, for example, in Iler, U.S. 2,657,149. These estersils are characterized by the chemical attachment of a monomolecular layer of primary or secondary alkoxy groups containing 2 to 18 carbon atoms to the silica surface. They can be produced by heating the silica with alcohol in the absence of any substantial amount of free water at a temperature of 190° C. for one hour in the case of the primary alcohols, or at a temperature up to 275° C. in the case of the secondary alcohols. As reported by Iler, the structure of the silica is unchanged by the esterification of the surface but the product is organophilic and where the coating is substantially complete, the product is hydrophobic.

Certain fine silicas fall in the class known as aerogels. An aerogel is a gel in which the liquid phase has been replaced by a gaseous phase in such a way as to avoid the shrinkage which would have occurred if the gel had been dried directly from a liquid. The method of manufacture on a commercial scale has been described by White, Chem. Indus., 51, 66-69 (1942); Trans. Am. Inst. Chem. Engrs., 38, 435-446 (1942). While the present invention contemplates the employment of the aerogels, the results obtained in practice indicate that these are less effective than the colloidal silicas derived by drying a silica sol or by burning silicon tetrachloride and also less effective than the estersils.

In practicing the invention it has been noted that where the fine powder employed contains $Na_2O$ in substantial amounts, there is a tendency toward the formation of a film when the powdered material is wet with water which is less effective for the purpose of the invention than a dry coating of the same material. It is therefore preferable in the practice of the invention that the ratio of $SiO_2$ to $Na_2O$ in the composition to be at least 3.2:1. In general, the specific surface area can vary within a relatively wide range, for example, within the range of 20 to 800 square meters per gram. The ultimate particle size can also vary within a relatively wide range, for example, within the range of 8 to 1000 millimicrons in diameter. The silica or silicate particles can be either hydrophilic or hydrophobic.

While the invention has been illustrated in the drawing with respect to a brake shoe particularly adapted for use on railroads, it will be understood that the general principles of the invention are applicable to other braking operations including brakes of the type used on automobiles where the braking surface of the braking element is expanded outwardly against a complementary braking surface or brake drum. The invention is also applicable to the rotating metal disc type of brake in which case one or both of the metal discs would be provided with inserts containing fine silica.

The invention is hereby claimed as follows:

1. A rigid braking element comprising a metal braking surface adapted for engagement with a complementary metal braking element comprising at least on a portion of said metal braking surface an area containing silica, said silica consisting essentially of particles having a specific surface area of 20 to 800 square meters per gram, and an average ultimate particle size within the range of 8 to 1000 millimicrons in diameter, said particles being capable of being dispersed in water to form a silica sol.

2. A rigid braking element adapted for engagement with a complementary metal braking element comprising a braking surface containing a friction material, said friction material including silica dispersed therein, said silica consisting essentially of particles having a specific surface area of 20 to 800 square meters per gram, and an average ultimate particle size within the range of 8 to 1,000 millimicrons in diameter, said particles being capable of being dispersed in water to form a silica sol.

References Cited in the file of this patent

UNITED STATES PATENTS

| | | |
|---|---|---|
| 223,771 | Stone | Jan. 20, 1880 |
| 265,070 | Henderson | Sept. 26, 1882 |
| 820,157 | Warmuth | May 8, 1906 |
| 1,666,167 | Connolly | Apr. 17, 1928 |
| 2,159,935 | Sanders | May 23, 1939 |
| 2,470,269 | Schaefer | May 17, 1949 |
| 2,628,896 | Erasmus et al. | Feb. 17, 1953 |
| 2,694,004 | Coffeen | Nov. 9, 1954 |

FOREIGN PATENTS

| | | |
|---|---|---|
| 2,514 | Great Britain | June 23, 1879 |
| 17,276 | Great Britain | July 20, 1910 |